(12) United States Patent
Saitoh et al.

(10) Patent No.: US 9,436,016 B2
(45) Date of Patent: Sep. 6, 2016

(54) LIQUID CRYSTAL SHUTTER EYEGLASS

(75) Inventors: Goroh Saitoh, Minato-ku (JP); Masao Imai, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 739 days.

(21) Appl. No.: 13/378,884

(22) PCT Filed: Apr. 28, 2010

(86) PCT No.: PCT/JP2010/057565
§ 371 (c)(1),
(2), (4) Date: Dec. 16, 2011

(87) PCT Pub. No.: WO2010/146943
PCT Pub. Date: Dec. 23, 2010

(65) Prior Publication Data
US 2012/0092572 A1     Apr. 19, 2012

(30) Foreign Application Priority Data
Jun. 19, 2009  (JP) .................... 2009-146496

(51) Int. Cl.
*G02B 27/22*    (2006.01)
*H04N 13/04*    (2006.01)
*G02F 1/1343*   (2006.01)

(52) U.S. Cl.
CPC ..... *G02B 27/2264* (2013.01); *G02F 1/134309* (2013.01); *H04N 13/0438* (2013.01); *H04N 2213/008* (2013.01)

(58) Field of Classification Search
CPC ............ G02B 27/225; G02B 27/2264; H04N 2213/008; H04N 13/0438
USPC ............................................. 349/13
See application file for complete search history.

(56) References Cited

U.S. PATENT DOCUMENTS

| | | | |
|---|---|---|---|
| 4,842,400 A * | 6/1989 | Klein | 351/158 |
| 2005/0243237 A1* | 11/2005 | Sasuga | 349/57 |
| 2008/0007511 A1* | 1/2008 | Tsuboi et al. | 345/102 |

(Continued)

FOREIGN PATENT DOCUMENTS

| JP | 56-165117 A | 12/1981 |
|---|---|---|
| JP | 57-188012 A | 11/1982 |

(Continued)

OTHER PUBLICATIONS

Office Action, dated Mar. 19, 2013, issued by the Japanese Patent Office in counterpart Japanese Patent Application No. 2011-519678.

(Continued)

*Primary Examiner* — Jessica M Merlin
(74) *Attorney, Agent, or Firm* — Sughrue Mion, PLLC

(57) ABSTRACT

A liquid crystal shutter eyeglass that can solve the problem in which the provision of excellent images cannot be kept if the situation of the viewer varies is provided. A liquid crystal shutter (2) has a light transmitting and shading region in which a state can change between a light transmitting state in which light is caused to transmit and a light shading state in which light is caused to be shaded. A driving section (51) changes the state between the light transmitting state and the light shading state of a driving region that is at least part of the light transmitting and shading region. A controlling means (52) adjusts at least one of a size and a position of the driving region of which the driving section (51) changes the state.

10 Claims, 12 Drawing Sheets

(56) References Cited

U.S. PATENT DOCUMENTS

| | | | |
|---|---|---|---|
| 2009/0066863 A1* | 3/2009 | Chen ............................ | 349/13 |
| 2009/0201362 A1* | 8/2009 | Shestak et al. ................ | 348/56 |
| 2010/0201897 A1* | 8/2010 | Saitoh ................ | G02B 27/017 |
| | | | 349/13 |

FOREIGN PATENT DOCUMENTS

| | | | |
|---|---|---|---|
| JP | 62-191819 A | 8/1987 | |
| JP | 1-147991 A | 6/1989 | |
| JP | 02-308214 A | 12/1990 | |
| JP | 04-345197 A | 12/1992 | |
| JP | 05-058124 U | 8/1993 | |
| JP | 06-225905 A | 8/1994 | |
| JP | 06-324287 A | 11/1994 | |
| JP | 08-211355 A | 8/1996 | |
| JP | 08-327949 A | 12/1996 | |
| JP | 09-054376 A | 2/1997 | |
| JP | 10-333094 A | 12/1998 | |
| JP | 2001-326949 A | 11/2001 | |
| JP | 2002-082307 A | 3/2002 | |
| JP | 2002-116217 A | 4/2002 | |
| JP | 2004-280042 A | 10/2004 | |
| JP | 2006-186768 A | 7/2006 | |
| JP | 2009-031524 A | 2/2009 | |
| JP | WO 2009044756 A1 * | 4/2009 | .......... G02B 27/017 |
| WO | WO 2009/044756 A1 | 4/2009 | |

OTHER PUBLICATIONS

Office Action dated Jun. 18, 2013 issued by Japanese Patent Office in counterpart Japanese Application No. 2011-519678.

* cited by examiner
LIQUID CRYSTAL SHUTTER EYEGLASS

CROSS REFERENCE TO RELATED APPLICATION

This application is a National Stage of International Application No. PCT/JP2010/057565, filed on Apr. 28, 2010, claiming priority based on Japanese Patent Application No. 2009-146496 filed Jun. 19, 2009, the contents of all of which are incorporated herein by reference in their entirety.

TECHNICAL FIELD

The present invention relates to a liquid crystal shutter eyeglass, in particular, to a liquid crystal shutter eyeglass that serves to view a field sequential display that displays a plurality of images based on a time division scheme.

BACKGROUND ART

Field sequential display systems that have a field sequential display that displays a plurality of images on a time-division basis and a liquid crystal shutter eyeglass have been proposed and developed.

As field sequential display systems, for example three-dimensional display systems that allow the viewer to perceive three-dimensional images are known.

FIG. 1 is a schematic diagram exemplifying a three-dimensional display system. In FIG. 1, the three-dimensional display system includes liquid crystal display device 100 that is a field sequential display and liquid crystal shutter eyeglass 101. Liquid crystal shutter eyeglass 101 has a liquid crystal shutter 101a for right eye and a liquid crystal shutter 101b for left eye.

Liquid crystal display device 100 alternately displays images for the right eye and images for the left eye. Right-eye type liquid crystal shutter 101a and left-eye type liquid crystal shutter 101b individually change between a light transmitting state in which light is caused to be transmitted and a light shading state in which light is caused to be shaded in synchronization with images for right eye and images for left eye that are displayed. Thus, images for right eye enter the right eye of viewer 102, whereas images for the left eye enter the left eye of viewer 102. If images for the right eye and images for the left eye are images that cause a parallax on the right and left eyes, these images can cause the viewer to perceive three-dimensional images.

As field sequential display systems, multi-view display systems that cause a plurality of viewers to perceive different images are known. A multi-view display system is presented in Patent Literature 1. The structure of the multi-view display system is the same as that of the three-dimensional display system shown in FIG. 1.

In the multi-view display system, liquid crystal display device 100 successively displays images for a plurality of viewers. Liquid crystal shutter eyeglass 101 which each of the plurality of viewers wears changes between the light transmitting state and the light shading state in synchronization with images displayed for the viewers. As a result, the multi-view display system can cause a plurality of viewers to perceive different images.

FIG. 2 is a descriptive diagram exemplifying the operation of a multi-view display system. In FIG. 2, three viewers 102a to 102c respectively wear liquid crystal shutter eyeglass 101.

Liquid crystal display device 100 successively displays image A1, image B1, image C1, and image A2. Liquid crystal shutter eyeglass 101 of viewer 102a changes the light transmitting state when images A1 and A2 are displayed; liquid crystal shutter eyeglass 101 becomes the light shading state when other images are displayed. Thus, viewer 102a successively perceives images A1 and A2.

Likewise, liquid crystal shutter eyeglass 101 of viewer 102b changes the light transmitting state when image B1 is displayed; liquid crystal shutter eyeglass 101 changes the light shading state when other images are displayed. Likewise, liquid crystal shutter eyeglass 101 of viewer 102c changes the light transmitting state when image C1 is displayed; liquid crystal shutter eyeglass 101 changes the light shading state when other images are displayed. Thus, viewer 102b perceives image B1, whereas viewer 102c perceives image C1.

As a result, viewers 102a to 102c perceive different images.

As field sequential display systems, a secure display system that causes only viewers who wear a liquid crystal shutter eyeglass to perceive images is known. In the case of a display for a portable information terminal such as a note-type personal computer as a field sequential display, a secure display system can accomplish a highly secured portable information terminal.

FIG. 3 is a schematic diagram exemplifying a secured display system.

In FIG. 3, field sequential display 104 of portable information terminal 103 alternately displays images and their inverted images, for example, image A, inverted image A' of image A, image B, inverted image B' of image B.

In this case, since a viewer who does not wear liquid crystal shutter eyeglass 101 perceives an achromatic image of which an image and its inverted image have been integrated, he or she cannot perceive images A and B.

In contrast, when liquid crystal shutter eyeglass 101 changes the light transmitting state in synchronization with images A and B that are displayed and changes the light shading state in synchronization with inverted images A' and B' displayed, viewer 102 who wears liquid crystal shutter eyeglass 101 can perceive images A and B.

Thus, the secure display system can cause only viewers who wear liquid crystal shutter eyeglass 1 to perceive images A and B.

In the foregoing field sequential display system, a change occurred in the state of the liquid crystal shutter eyeglass changed between the light transmitting state and the light shading state in which not only display light emitted from the field sequential display, but also ambient light, except for display light, is emitted. Thus, as a problem that arises, the viewer senses flickering caused by ambient light. In particular, if ambient light contains light emitted from a light source such as a fluorescent lamp that instantaneously flickers, since the period in which a change occur in the state of the liquid crystal shutter eyeglass, between the light transmitting state and the light shading state, deviates from the period in which ignition of the light source occurs, flickering that the viewer senses becomes large.

As techniques that reduce flickering caused by ambient light, a three-dimensional image recognition device, as presented in Patent Literature 2, and a three-dimensional image display device, as presented in Patent Literature 3, are known.

The three-dimensional image recognition device presented in Patent Literature 2 is provided with a CRT and a liquid crystal shutter eyeglass. Provided on the display screen of the CRT is a linearly polarizing filter. Moreover, in the liquid crystal shutter eyeglass, a liquid-crystal-injected glass plate into which liquid crystal has been injected, and a linearly polarizing filter are stacked such that the liquid-crystal-injected glass plate faces the CRT.

In the foregoing three-dimensional image recognition device, since the display light emitted from the CRT becomes polarized light, when the orientation of the polarized light that is transmitted through the liquid crystal that has been injected in the liquid-crystal-injected glass plate is changed, a change can occur in the state of the display light between the light transmitting state and the light shading state. In contrast, since ambient light is not polarized light, even if display light is shaded by the liquid crystal shutter eyeglass, ambient light is not shaded. Thus, since ambient light always transmits through the liquid crystal shutter eyeglass, flickering caused by the ambient light can be reduced.

The three-dimensional image display device presented in Patent Literature 3 is provided with a color picture tube and a polarizing eyeglass. Formed on the display screen of the color picture tube is a liquid crystal layer.

In the foregoing three-dimensional image display device, when the orientation of the polarized light of the display light emitted that is from the color picture tube is changed by the liquid crystal layer, a change can occur in the state of the polarizing eyeglass between the light transmitting state and the light shading state of the display light. In this three-dimensional image display device, like the three-dimensional image recognition device presented in Patent Literature 2, since the ambient light is not shaded by the liquid crystal shutter eyeglass, flickering caused by the ambient light can be reduced.

Besides the techniques presented in Patent Literatures 2 and 3, it can be contemplated that when part of the lens section of the liquid crystal shutter eyeglass is a liquid crystal shutter, flickering that the viewer senses will be reduced.

FIG. 4A is a side view showing a liquid crystal shutter eyeglass in which part of the lens section is a liquid crystal shutter; FIG. 4B is a descriptive diagram showing that a viewer who wears the liquid crystal shutter eyeglass shown in FIG. 4A is viewing a field sequential display.

As shown in FIG. 4A, lens section 200 of the liquid crystal shutter eyeglass is supported by frame 201. In addition, formed in lens section 200 is liquid crystal shutter 202 that has a diameter smaller than the lens diameter. Moreover, liquid crystal shutter 202 is composed of liquid crystal cell 203 and a pair of polarizing layers 204 that sandwich liquid crystal cell 203.

As shown in FIG. 4B, viewer 210 views field sequential display 212 with visual field range 211A. At this point, when display light emitted from field sequential display 212 enters liquid crystal shutter 202, since a change occurs in the state between the light transmitting state and the light shading state, display light 221 that lies in the light transmitting state changes to the light shading state.

Now, it is assumed that ambient light 222 that is emitted from fluorescent lamp 213 or the like enters the eyes of viewer 210 from peripheral visual field range 211B of visual field range 211A of the viewer but does not pass through liquid crystal shutter 202 in lens section 200. In this case, since no change occurs in liquid crystal shutter 202 between the light transmitting state and the light shading state of ambient light 222, flickering that viewer 210 senses can be reduced.

Liquid crystal shutter eyeglasses in which part of the lens section is a liquid crystal shutter and the related techniques are presented in Patent Literatures 4 to 11.

RELATED ART LITERATURE

Patent Literature

Patent Literature 1: JP2006-186768A, Publication
Patent Literature 2: JP2002-82307A, Publication
Patent Literature 3: JP62-191819A, Publication
Patent Literature 4: JP8-327949A, Publication
Patent Literature 5: JP2004-280042A, Publication
Patent Literature 6: JP6-324287A, Publication
Patent Literature 7: JP57-188012A, Publication
Patent Literature 8: JP2002-116217A, Publication
Patent Literature 9: JP2-308214A, Publication
Patent Literature 10: JP56-165117A, Publication
Patent Literature 11: JP6-324287A, Publication

SUMMARY OF THE INVENTION

Problem to be Solved by the Invention

The techniques presented in Patent Literatures 2 and 3 have the following problems.

To allow the three-dimensional display system to provide the viewer with excellent images, the angle between the polarizing plane of the polarizing filter provided in the liquid crystal shutter eyeglass and the polarizing plane of the polarizing filter provided on the display screen of the display device needs to be kept at a predetermined value.

If the angle between these planes deviates from the predetermined value, the liquid crystal shutter eyeglass cannot sufficiently cause light to be transmitted therethrough and to be shaded, for example, phenomenon arises, in which the liquid crystal shutter eyeglass that lies in the light shading state causes part of the display light to be transmitted therethrough and thereby the light enters the eyes of the viewer. In this case, unexpected light enters the eyes of the viewer and thereby he or she cannot perceive excellent images.

Since the angle between these planes varies depending on the relationship of the positions of the viewer and the display device, the tilts angle of the body of the viewer and of the liquid crystal shutter eyeglass, and so forth, it is difficult to keep the angle between these planes at the predetermined value.

Thus, according to the techniques presented in Patent Literatures 2 and 3, as a problem arises, although excellent images can be provided while the viewer is viewing a field sequential display in a particular situation, if the situation changes, excellent images cannot be provided.

According to the techniques presented in Patent Literatures 2 and 3, display light from a CRT or a color picture tube needs to be polarized light. Thus, if a display device such as a CRT, a plasma display, or an organic EL display that outputs non-polarized light is used as a field sequential display, a polarizing filter needs to be provided on the display screen of the display device.

Thus, when the display device is used as an ordinary display that does not display images based on the time-division scheme, since the polarizing filter attenuates display light that is emitted from the display device, another problem arises in which the display screen becomes dark.

On the other hand, the technique that uses part of the lens section of the liquid crystal shutter eyeglass as a liquid crystal shutter and thereby reduces flickering has the following problem.

FIG. 5 is a descriptive diagram describing the problem on the technique that uses part of the lens section of the liquid crystal shutter as a liquid crystal shutter.

FIG. 5 shows that viewer 300 who wears liquid crystal shutter eyeglass 301 is viewing field sequential displays 302 and 303. In liquid crystal shutter eyeglass 301, part of the lens section is liquid crystal shutter 301A. Moreover, it is assumed that the display screen of field sequential display 303 is smaller than that of field sequential display 302.

In addition, it is assumed that when viewer 300 views field sequential display 302, display light 304A emitted from field sequential display 302 enters liquid crystal shutter 301A and ambient light 305A other than display light 304A does not enter liquid crystal shutter 301. In this case, since no change occurs in the state of liquid crystal shutter 301A between the light transmitting state and the light shading state, excellent images can be provided to viewer 300.

When viewer 300 views field sequential display 303 at the same position as that of field sequential display 302, since the display screen of field sequential display 303 is smaller than that of field sequential display 302, display light 304B that is emitted from field sequential display 303 and ambient light 305B other than display light 304B instead of display light 304A enters liquid crystal shutter 301A. Thus, since a change occurs in the state of liquid crystal shutter 301A between the light transmitting state and the light shading state of ambient light 305B, the viewer senses flickering.

If the distance between viewer 300 and field sequential display 302 varies, such as when like the case that viewer 300 views field sequential display 303 at the same position as that of field sequential display 302, ambient light may enter liquid crystal shutter 301A.

Thus, like the techniques presented in Patent Literatures 2 and 3, according to the technique that uses part of the lens section of the liquid crystal shutter eyeglass as the liquid crystal shutter, a problem arises in which although excellent images can be provided to the viewer who views the field sequential display in a particular situation, if the situation of the viewer varies, excellent images cannot be provided.

Patent Literatures 4 to 11 do not describe the reduction of flickering and thereby they cannot solve this problem.

An object of the present invention is to provide a liquid crystal shutter eyeglass that can solve the problem in which it is not possible to provide excellent images if the situation of the viewer varies.

Means that Solve the Problem

A liquid crystal shutter eyeglass according to the present invention is a liquid crystal shutter eyeglass that includes a liquid crystal shutter having a light transmitting and shading region in which a state can change between a light transmitting state in which light is caused to transmit and a light shading state in which light is caused to be shaded; driving means that changes the state between said light transmitting state and said light shading state of a driving region that is at least part of said light transmitting and shading region; and controlling means that adjusts at least one of a size and a position of said driving region.

Effect of the Invention

According to the present invention, even if the situation of the viewer varies, providing excellent images can be maintained.

BEST MODES THAT CARRY OUT THE INVENTION

Figure 1:
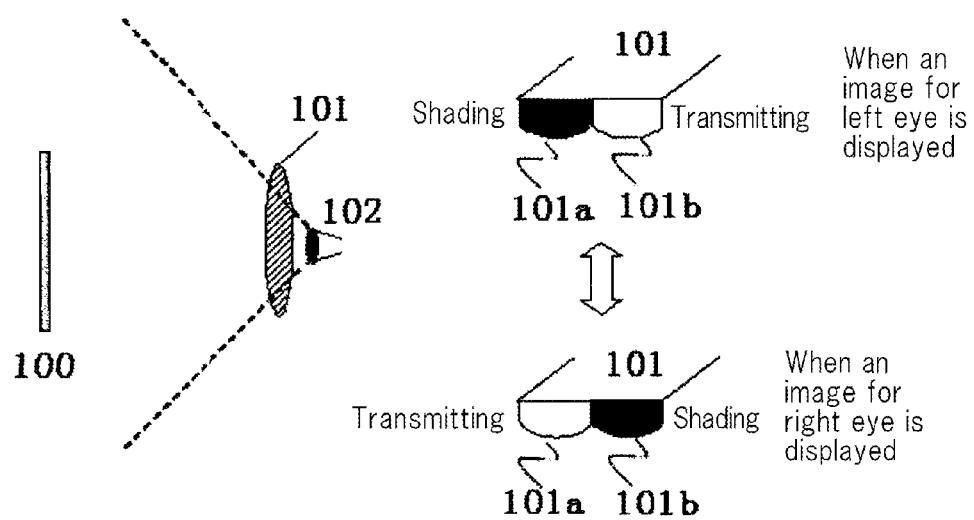
FIG. 1 is a schematic diagram exemplifying a three-dimensional display system.
Figure 2:
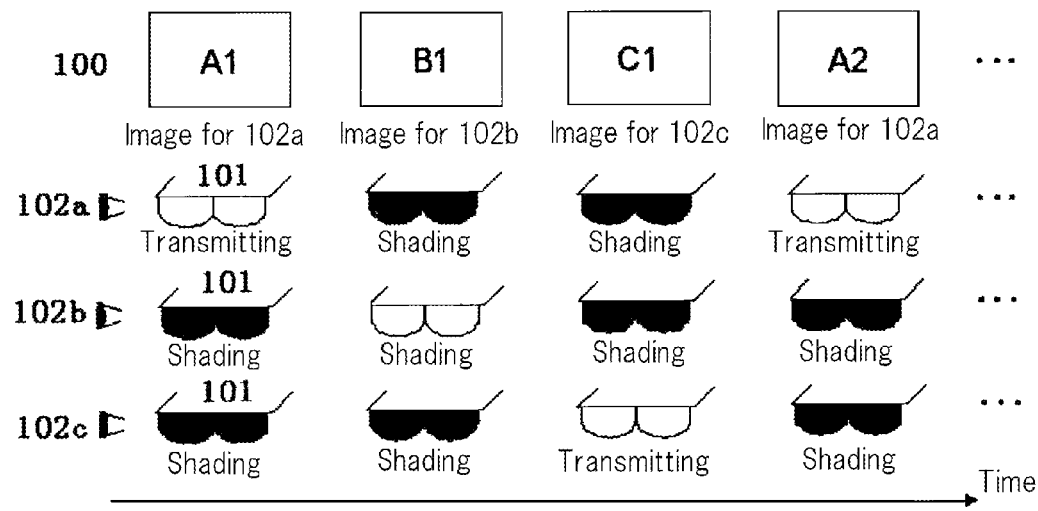
FIG. 2 is a descriptive diagram describing an example of the operation of a multi-view display system.
Figure 3:
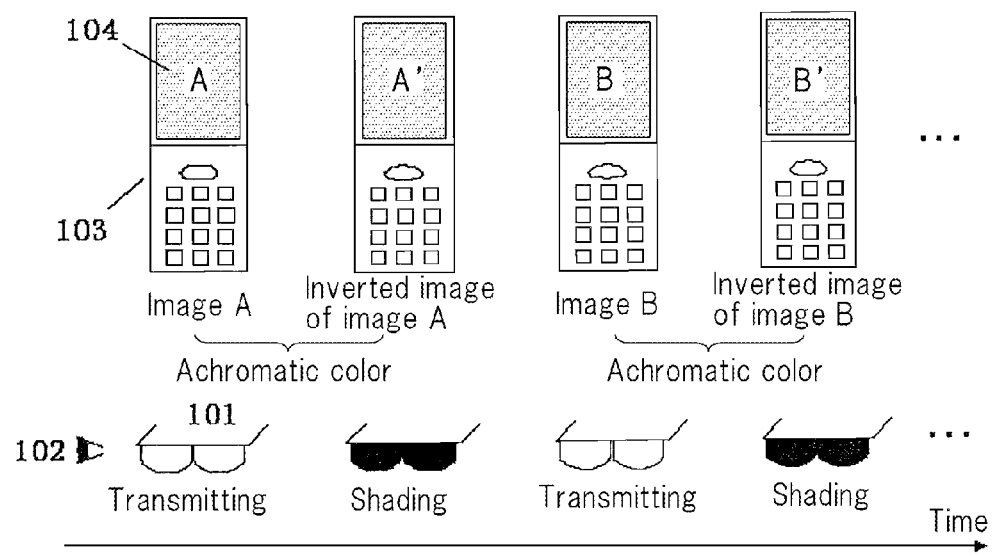
FIG. 3 is a schematic diagram exemplifying a secure display system.
Figure 4A:
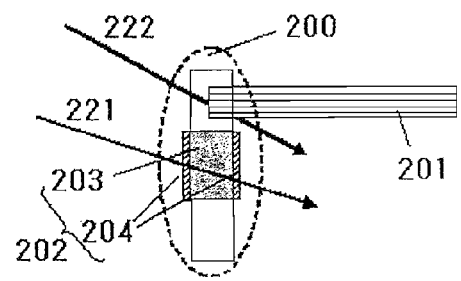
FIG. 4A is a side view showing a liquid crystal shutter eyeglass in which part of a lens section is a liquid crystal shutter.
Figure 4B:
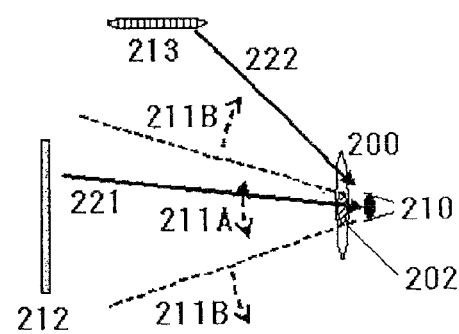
FIG. 4B is a descriptive diagram showing that a viewer who wears the liquid crystal shutter eyeglass shown in FIG. 4A is viewing a field sequential display.
Figure 5:
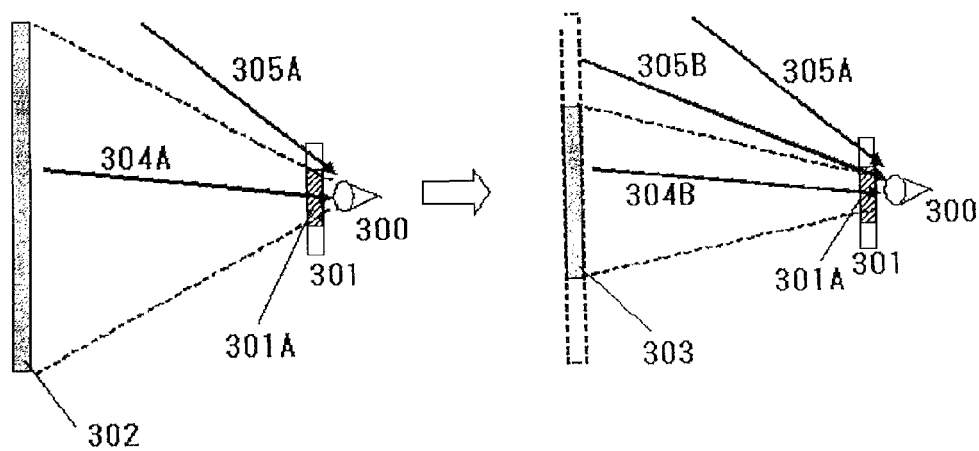
FIG. 5 is a descriptive diagram describing a problem of a technique that uses part of the liquid crystal shutter eyeglass as a liquid crystal shutter.

Next, with reference to drawings, an embodiment of the present invention will be described. In the following description, structures and processes having similar functions will be denoted by similar reference numerals and their description will be omitted.

Figure 6:
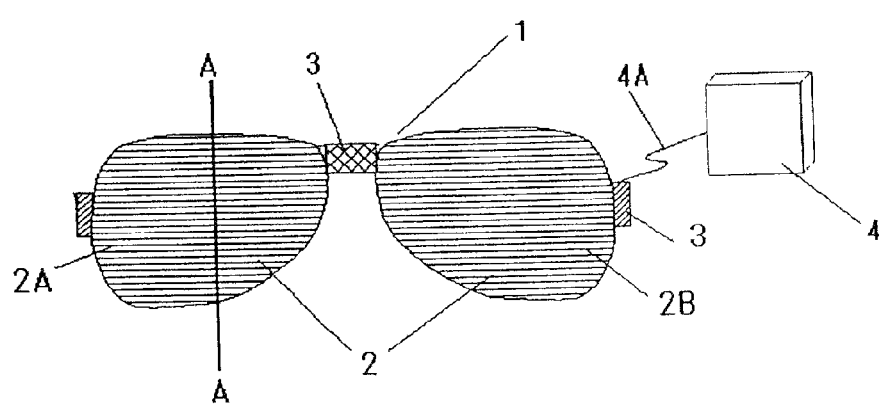
FIG. 6 is a plan view showing an appearance of a liquid crystal shutter eyeglass according to a first embodiment of the present invention.

FIG. 6 is a plan view showing the appearance of a liquid crystal shutter eyeglass according to a first embodiment of the present invention. In FIG. 6, liquid crystal shutter eyeglass 1 has liquid crystal shutter 2, eyeglass frame 3, and controlling device 4.

Liquid crystal shutter 2 is provided in a lens section of liquid crystal shutter eyeglass 1.

Liquid crystal shutter 2 is a liquid crystal device that has a light transmitting and shading region in which a change to occur in the state of liquid crystal shutter 2 between a light transmitting state in which light is caused to be transmitted and a light shading state in which light is caused to be shaded. More specifically, liquid crystal shutter 2 has right-eye type liquid crystal shutter 2A and left-eye type liquid crystal shutter 2B each of which has the light transmitting and shading region. Note that the entire region of liquid crystal shutter 2 may be the light transmitting and shading region or part of which may be the light transmitting and shading region.

Controlling device 4 and liquid crystal shutter 2 are mutually connected through wiring 4A. Alternatively, controlling device 4 may be built in eyeglass frame 3.

Controlling device 4 causes a change to occur in the state between the light transmitting state and the light shading state of a driving region that is at least part of the light transmitting and shading region of each of liquid crystal shutters 2A and 2B.

Figure 7:
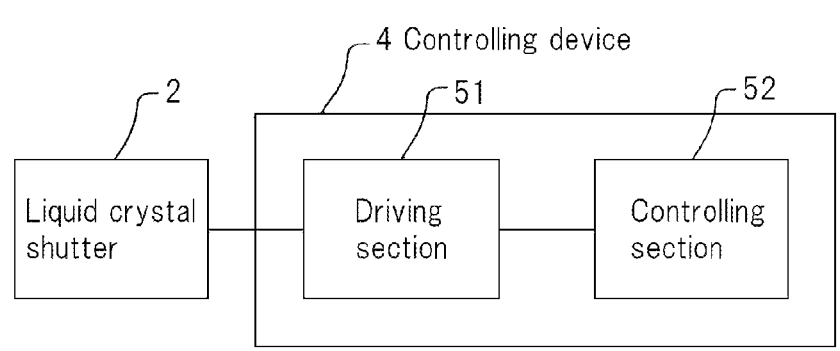
FIG. 7 is a block diagram showing an example of the structure of a controlling device.

FIG. 7 is a block diagram showing an example of the structure of controlling device 4. In FIG. 7, controlling device 4 has driving section 51 and controlling section 52.

Driving section 51 changes the state between the light transmitting state and the light shading state of the driving region that is at least part of the light transmitting and shading region.

Controlling section 52 adjusts at least one of the size and position of the driving region of which driving section 51 changes the state. For example, liquid crystal shutter eyeglass 1 has an operation section (not shown) that serves to adjust the driving region, and controlling section 52 adjusts at least one of the size and position of the driving region as the viewer operates the operation section.

Figure 8A:
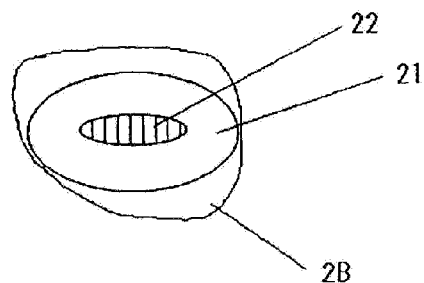
FIG. 8A is a descriptive diagram showing an example of a driving region.
Figure 8B:
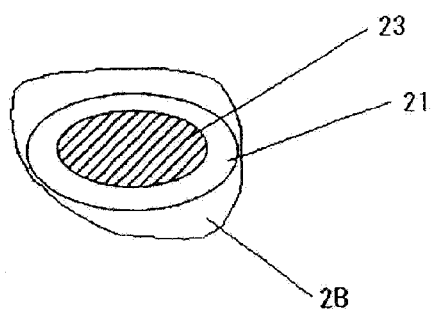
FIG. 8B is a descriptive diagram showing another example of the driving region.
Figure 8C:
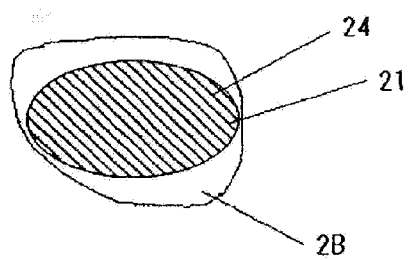
FIG. 8C is a descriptive diagram showing another example of the driving region.

FIG. 8A to FIG. 8C are descriptive diagrams showing examples of the light transmitting and shading region and the driving region. FIG. 8A shows light transmitting and shading region 21 and driving region 22 of liquid crystal shutter 2B. FIG. 8B shows light transmitting and shading region 21 and driving region 23 of liquid crystal shutter 2B. FIG. 8C shows light transmitting and shading region 21 and driving region 24 of liquid crystal shutter 2B. Driving regions 22 to 24 are three elliptical regions whose centers are the same and whose sizes are different. Note that driving region 24 is the same region as light transmitting and shading region 21.

In this case, controlling section 52 adjusts one of driving regions 22 to 24 as the driving region in which driving section 51 changes the state.

According to this embodiment, liquid crystal shutter 2 has the light transmitting and shading region in which a change to occur in the state of liquid crystal shutter 2 between the light transmitting state in which light is caused to be transmitted and the light shading state in which light is caused to be shaded. Driving section 51 changes the state between the light transmitting state and the light shading state of the driving region that is at least part of the light transmitting and shading region. Controlling section 52 adjusts at least one of the size and position of the driving region of which driving section 51 changes the state.

In this case, since at least one of the size and position of the driving region in which the state changes between the light transmitting state and the light shading state is adjusted, even if the situation of the viewer varies, excellent images can be still provided. Next, this reason will be described in detail.

Figure 9A:
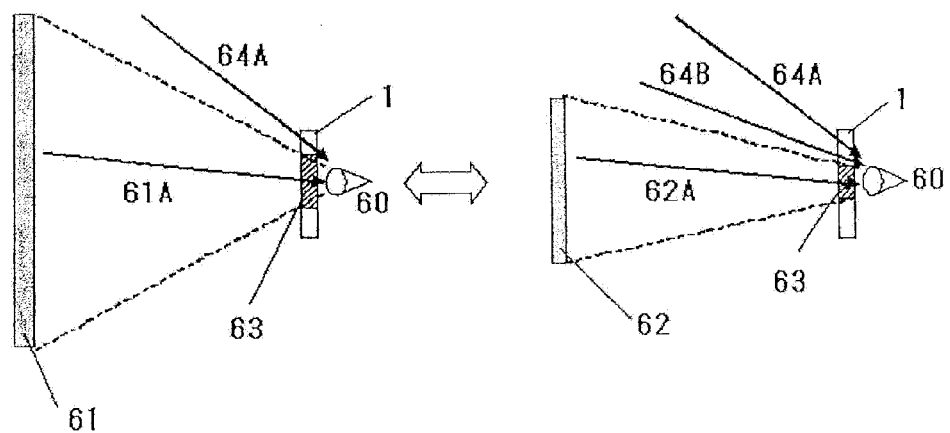
FIG. 9A is a descriptive diagram describing an example in which flickering that a viewer senses can be suppressed even if his or her situation varies.
Figure 9B:
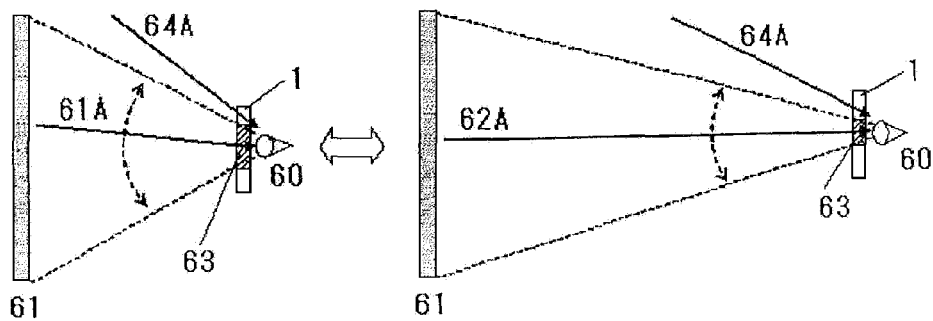
FIG. 9B is a descriptive diagram describing another example in which flickering that a viewer senses can be suppressed even if his or her situation varies.

FIG. 9A and FIG. 9B are descriptive diagrams describing that a sense of flickering that is can perceived by the viewer can be suppressed even if the situation of the viewer varies.

FIG. 9A shows that viewer 60 who wears liquid crystal shutter eyeglass 1 is viewing field sequential displays 61 and 62. In this case, it is assumed that the display screen of field sequential display 62 is smaller than that of field sequential display 61.

In addition, it is assumed that when viewer 60 views field sequential display 61, display light 61A emitted from field sequential display 61 enters driving region 63 of liquid crystal shutter eyeglass 1, but ambient light 64A other than display light 61A does not. In this case, since a change in the state of liquid crystal shutter eyeglass 1 does not occurs between the light transmitting state and the light shading state of ambient light 64A, the viewer does not sense flickering.

If field sequential display 61 is changed to field sequential display 62, since the display screen of field sequential display 62 is smaller than the display screen of field sequential display 61, both display light 62A that is emitted from field sequential display 62 and ambient light 64B instead of display light 61A enter liquid crystal shutter eyeglass 1.

At this point, unless driving region 63 is adjusted, a change will occur in the state of liquid crystal shutter eyeglass 1 between the light transmitting state and the light shading state of ambient light 64B as its state changes between the light transmitting state and the light shading state of driving region 63, as a result viewer 60 will senses flicker.

In contrast, if driving region 63 is adjusted such that display light 62A enters driving region 63, but ambient light 64B does not, even if a changes occurs the state of liquid crystal shutter eyeglass 1 between the light transmitting state and the light shading state of driving region 63, since no change will occur in the state of liquid crystal shutter eyeglass 1 between the light transmitting state and the light shading state of ambient light 64B, viewer 60 does not sense flickering.

FIG. 9B also shows that viewer 60 who wears liquid crystal shutter eyeglass 1 is viewing field sequential display 61 at different positions.

If the distance from viewer 60 to field sequential display 61 is close, it is necessary to widen driving region 63 so as to cause display light 61A emitted from the entire display screen of field sequential display 61 to enter driving region 63.

As the distance from viewer 60 to field sequential display 61 becomes far, driving region 63 that display light 61A that is emitted from the entire display screen of field sequential display 61 and that enters driving region 63 can be small. At this point, unless the size of driving region 63 is changed, since ambient light 64A other than display light 61A enters driving region 63, the viewer senses flickering.

Thus, when the distance from viewer 60 to field sequential display 61 becomes far, if the size of driving region 63 is decreased such that that display light 62A enters driving region 63, but ambient light 64A does not, viewer 60 does not sense flickering.

Thus, according to this embodiment, even if the situation such as the size of the display screen of the field sequential display that the viewer views or the distance from the viewer to the field sequential display varies, when the driving region is adjusted, t providing excellent images can be maintained.

Next, a second embodiment will be described. In this embodiment, the structure of liquid crystal shutter 2 will be described in more detail.

Figure 10:
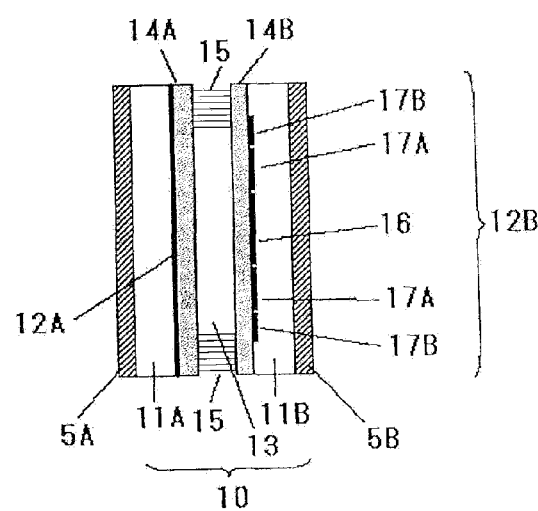
FIG. 10 is a sectional view showing an example of a liquid crystal shutter.

FIG. 10 is a sectional view showing liquid crystal shutter 2. More specifically, FIG. 10 is a sectional view taken along A-A of liquid crystal shutter 2A shown in FIG. 6.

Liquid crystal shutter 2A has a pair of polarizing layers 5A and 5B and liquid crystal cell 10 sandwiched by polarizing layers 5A and 5B.

Each of polarizing layers 5A and 5B causes linearly polarized light in the direction of a predetermined light transmission axis of incident light to be transmitted therethrough. The direction of the light transmission axis of polarizing layer 5A is different from that of polarizing layer 5B. In addition, it is assumed that polarizing layer 5A is formed on the front surface of liquid crystal shutter eyeglass 1.

Liquid crystal cell 10 has a pair of transparent substrates 11A and 11B, a pair of electrodes 12A and 12B, liquid crystal layer 13, and a pair of alignment films 14A and 14B.

Transparent substrates 11A and 11B are arranged such that they face each other. In addition, polarizing layers 5A and 5B are formed on the opposite surfaces of the facing surfaces of transparent substrates 11A and 11B, respectively. In the following, it is assumed that polarizing layer 5A is formed on transparent substrate 11A and polarizing layer 5B is formed on transparent substrate 11B.

Electrode 12A is formed on transparent substrate 11A such that the electrode 12A faces transparent substrate 11B and electrode 12B is formed on transparent substrate 11B such that electrode 12B faces transparent substrate 11A.

Liquid crystal layer 13 is injected between electrodes 12A and 12B. In this embodiment, peripheral portions of transparent substrates 11A and 11B adhere to each other using sealing agent 15 and liquid crystal layer 13 is injected in a space surrounded by sealing agent 15.

Alternatively, liquid crystal layer 13 may be composed of, for example, a TN type or VA type nematic liquid crystal material. Further alternatively, liquid crystal layer 13 may be composed of, for example, an SSFLC type smectic liquid crystal material.

Alignment film 14A is formed between electrode 12A and liquid crystal layer 13 and alignment film 14B is formed between electrode 12B and liquid crystal layer 13.

An alignment treatment has been performed for alignment films 14A and 14B such that when a voltage is applied to electrodes 12A and 12B, the orientations of liquid crystal molecules in liquid crystal layer 13 vary and a change occur in the state of liquid crystal shutter 2A (more specifically, liquid crystal layer 13) between the light transmitting state and the light shading state. The alignment treatment is for example a rubbing treatment.

It is assumed that the directions of the optical transmission axes of polarizing layers 5A and 5B are orthogonal to each other and that liquid crystal layer 13 is composed of a TN type nematic liquid crystal material. In this case, the alignment treatment is performed for electrodes 12A and 12B such that the alignment direction of liquid crystal of liquid crystal layer 13 that faces polarizing layer 5B becomes parallel to the direction of the light transmission axis of polarizing layer 5A and that the alignment direction of liquid crystal of liquid crystal layer 13 that faces polarizing layer 5B becomes parallel to the direction of the light transmission axis of polarizing layer 5B. As a result, the twist angle of liquid crystal layer 13 becomes 90°.

In this case, in the no-voltage applied state where no voltage is being applied between electrodes 12A and 12B, when light that enters polarizing layer 5A is transmitted through polarizing layer 5A, the light becomes linearly polarized light in which the direction of the light transmission axis of polarizing layer 5B becomes the polarizing direction. While the linearly polarized light is passing through liquid crystal layer 13, since the polarizing direction varies by 90°, the linearly polarized light is transmitted through polarizing layer 5B and thereby the liquid crystal shutter 2A changes to the light transmitting state.

On the other hand, in the voltage applied state where a voltage is being applied between electrodes 12A and 12B, when linearly polarized light that has been transmitted through polarizing layer 5A passes through liquid crystal layer 13, since the polarizing direction of linearly polarized light does not vary, it cannot be transmit through polarizing layer 5B. Thus, liquid crystal shutter 2A changes to the light shading state. In this case, the orientations of liquid crystal molecules in liquid crystal layer 13 do not vary unless a voltage that is equal to or greater than a threshold that has been decided depending on liquid crystal layer 13 is applied. Thus, it is assumed that in the voltage applied state, a voltage equal to or greater than the threshold has been applied between electrodes 12A and 12B.

Alternatively, although liquid crystal shutter 2A may be formed such that in the no-voltage applied state, liquid crystal shutter 2A lies in the light shading state and in the voltage applied state, liquid crystal shutter 2A lies in the light transmitting state, as described above, it is preferable that in the no-voltage applied state, liquid crystal shutter 2A lie in the light transmitting state and in the voltage applied state, liquid crystal shutter 2A lie in the light shading state. In other words, it is preferred that liquid crystal shutter 2A be a normally white type liquid crystal shutter. In the following, it is assumed that liquid crystal shutter 2A is a normally white type liquid crystal shutter. This means that in the case in which the state of the light transmitting and shading region does not need to be changed, the normally white type liquid crystal shutter ensures the visual field of the viewer.

Next, electrodes 12A and 12B will be described in more detail.

Electrode 12A or 12B or Electrodes 12A and 12B is/are a segmented electrode that is/are divided into a plurality of separate electrodes. A segmented electrode has as separate electrodes, for example, a center electrode and an outer peripheral electrode that surround the center electrode. The number of peripheral electrodes can be at least one.

In FIG. 10, electrode 12B is a segmented electrode and has center electrode 16 and outer peripheral electrodes 17A and 17B that surround center electrode 16. Electrode 12A is a plane electrode that is not divided into a plurality of separate electrodes.

Figure 11:
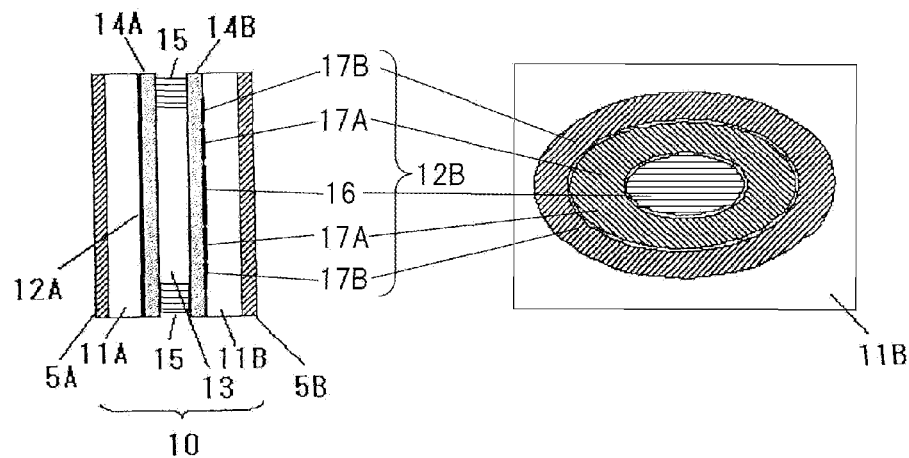
FIG. 11 is a schematic diagram showing an example of a segmented electrode.

FIG. 11 is a schematic diagram showing center electrode 16 and outer peripheral electrodes 17A and 17B. As shown in FIG. 11, outer peripheral electrode 17A surrounds center electrode 16, whereas outer peripheral electrode 17B surrounds center electrode 16 and outer peripheral electrode 17A.

A region of liquid crystal layer 13 corresponding to an electrode to which a voltage is applied of center electrode 16 and outer peripheral electrodes 17A and 17B becomes a driving region. In other words, a region sandwiched by an electrode to which a voltage is applied and electrode 12A that faces the voltage applied electrode becomes a driving region.

If a voltage is applied to center electrode 16 and no voltage is applied to outer peripheral electrodes 17A and 17B, a region of liquid crystal layer 13 sandwiched by center electrode 16 and electrode 12A becomes the light shading state and the other region is kept in the light transmitting state. When the application of the voltage is stopped, the region sandwiched by center electrode 16 and electrode 12A returns to the light transmitting state. Thus, the region sandwiched by center electrode 16 and electrode 12A becomes a driving region.

If voltage is applied to each of center electrode 16 and outer peripheral electrodes 17A and 17B, each of a region of liquid crystal layer 13 sandwiched by center electrode 16 and electrode 12A, a region of liquid crystal layer 13 sandwiched by outer peripheral electrode 17A and electrode 12A, and a region of liquid crystal layer 13 sandwiched by outer peripheral electrode 17B and electrode 12A becomes the light shading state. When the application of the voltage is stopped, these regions returns to the light transmitting state. Thus, all of the region sandwiched by center electrode 16 and electrode 12A, the region sandwiched by outer peripheral electrode 17A and electrode 12A, and the region sandwiched by outer peripheral electrode 17B and electrode 12A become a driving region.

Thus, since separate electrodes to which a voltage is applied are selected, at least one of the size and position of the driving region can be adjusted.

Figure 12:
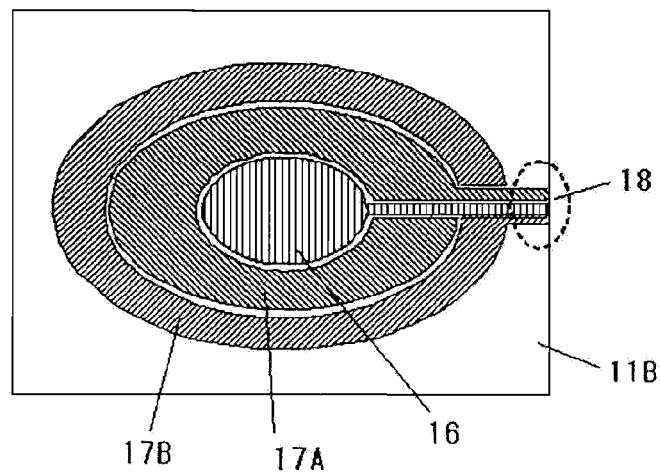
FIG. 12 is a schematic diagram showing another example of the segmented electrode.
Figure 13:
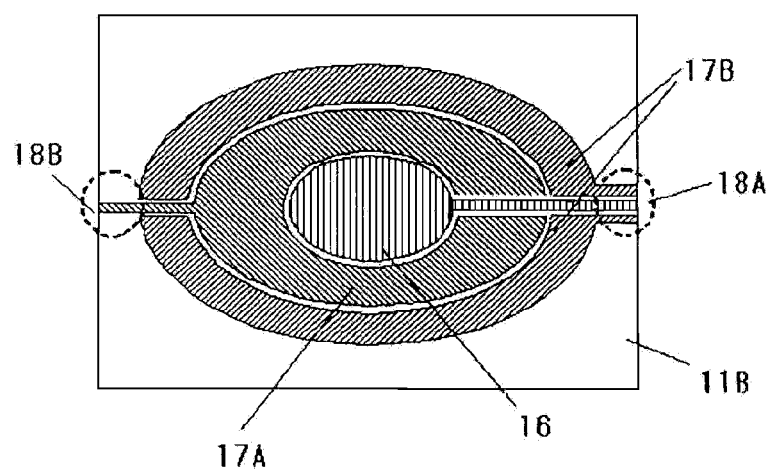
FIG. 13 is a schematic diagram showing another example of the segmented electrode.

Each electrode of the segmented electrode can be patterned and formed on the same layer of a transparent substrate. FIG. 12 and FIG. 13 are plan views showing center electrode 16 and outer peripheral electrodes 17A and 17B formed on the same layer of transparent substrate 11B.

In FIG. 12 and FIG. 13, each of center electrode 16 and outer peripheral electrodes 17A and 17B is formed on the same layer of transparent substrate 11B. In FIG. 12, electrode lead portions 18 of center electrode 16 and outer peripheral electrodes 17A and 17B are provided in the same direction. By contrast, in FIG. 13, electrode lead portions 18A of center electrode 16 and outer peripheral electrode 17B are formed in the same direction and electrode lead portion 18B of outer peripheral electrode 17A is formed in the reverse direction of electric lead portion 18A.

Non-light transmitting and shading regions in which a change does not occur in the state between the light transmitting state and the light shading state are present between center electrode 16 and outer peripheral electrode 17A and between outer peripheral electrode 17A and outer peripheral electrode 17B. Since the non-light transmitting and shading regions can be formed as very small areas, the viewer can be prevented from sensing light leakage from the non-light transmitting and shading regions. Alternatively, if a black matrix layer that causes light to be shaded is formed in the non-light transmitting and shading regions, light leakage from the non-light transmitting and shading regions can be suppressed.

Figure 14:
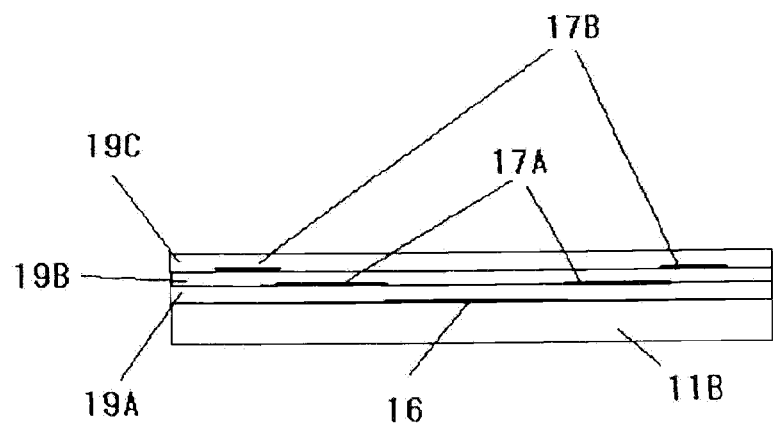
FIG. 14 is a schematic diagram showing another example of the segmented electrode.

Alternatively, each electrode of the segmented electrode may be arranged through for example, an insulation layer. FIG. 14 is a sectional view showing center electrode 16 and outer peripheral electrodes 17A and 17B formed through respective insulation layers.

In FIG. 14, center electrode 16 is formed on transparent substrate 11B. Likewise, insulation layer 19A is formed on center electrode 16, whereas outer peripheral electrode 17A is formed on insulation layer 19A. Further likewise, insulation layer 19B is formed on outer peripheral electrode 17A, whereas outer peripheral electrode 17B is formed on insulation layer 19B. Further likewise, insulation layer 19C is formed on outer peripheral electrode 17B.

Although both electrodes 12A and 12B may be segmented electrodes, if one of them is a plane electrode, when the lead portions of the segmented electrode are arranged such that they do not overlap with the plane electrode, the lead portions of the segmented electrode can be prevented from becoming visually obstructive.

Figure 15:
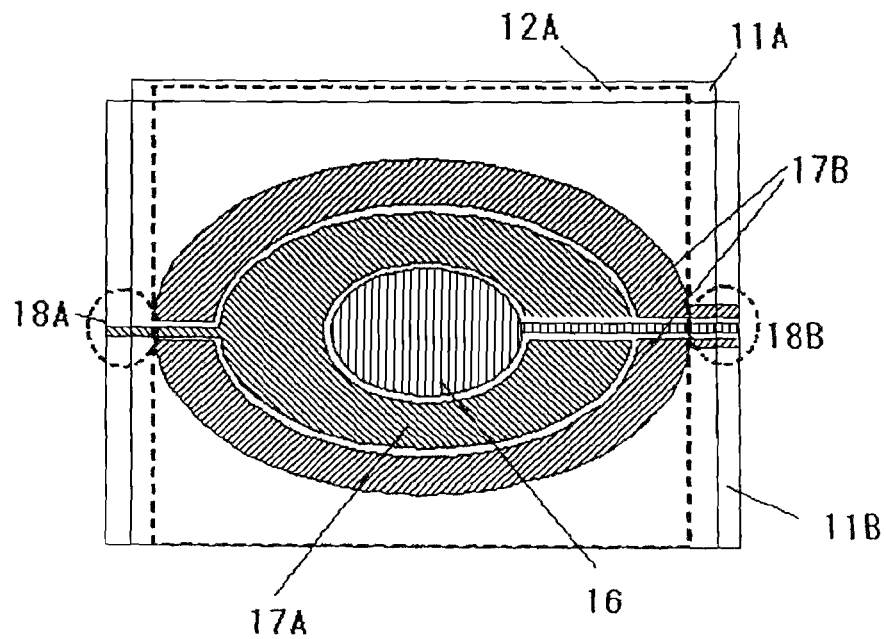
FIG. 15 is a schematic diagram showing another example of the segmented electrode.

For example, as shown in FIG. 15, when electrode lead portions 18A and 18B are arranged such that they do not overlap with electrode 12A, which is a plane electrode, electrode lead portions 18A and 18B can be prevented from becoming visually obstructive.

Next, the shapes and positions of electrodes will be described.

Figure 16:
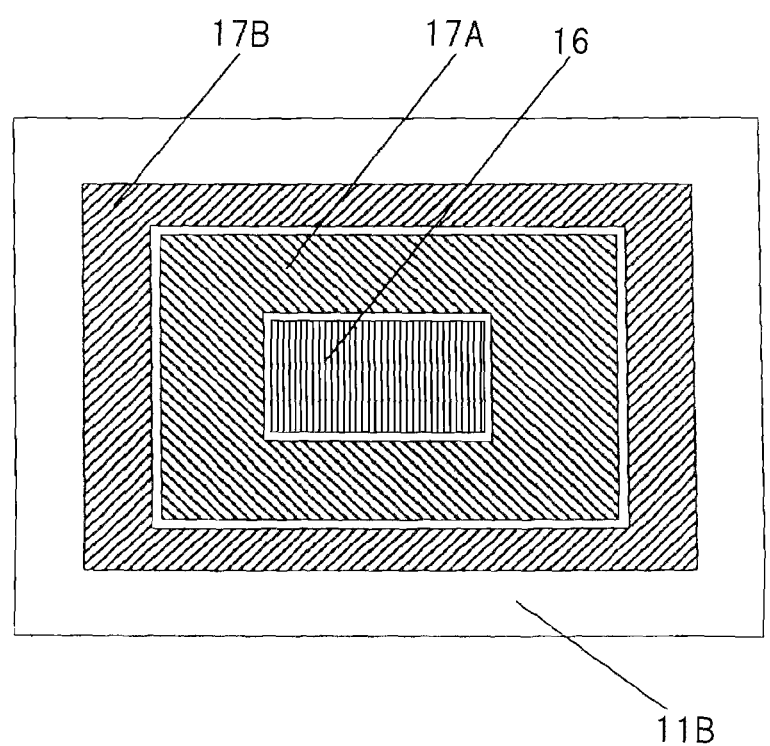
FIG. 16 is a schematic diagram showing another example of the segmented electrode.

When the viewer who wears liquid crystal shutter eyeglass 1 views a field sequential display, the line of sight of the viewer tends to move in the left and right direction rather than in the up and down direction. Thus, it is preferable that center electrode 16 be an elliptic shape whose longer axis direction is parallel to the left and right direction of liquid crystal shutter eyeglass 1 as shown in FIG. 11 or center electrode 16 be a rectangular shape whose longitudinal direction is parallel to the left and right direction of liquid crystal shutter eyeglass 1 as shown in FIG. 16. In this case, it is preferable that the inner peripheral shape and outer peripheral shape of the outer peripheral electrode be similar to the inner peripheral shape and the outer peripheral shape of the center electrode.

As a target that the viewer views is close to him or her, the line of sight of the viewer tends to orient the center direction of his or her face; as a target that the viewer views is far from him or her, the line of sight of the viewer approaches the forward direction of his or her face. Thus, the line of sight of the viewer tends to lie between the forward direction and center direction of his or her face.

Figure 17:
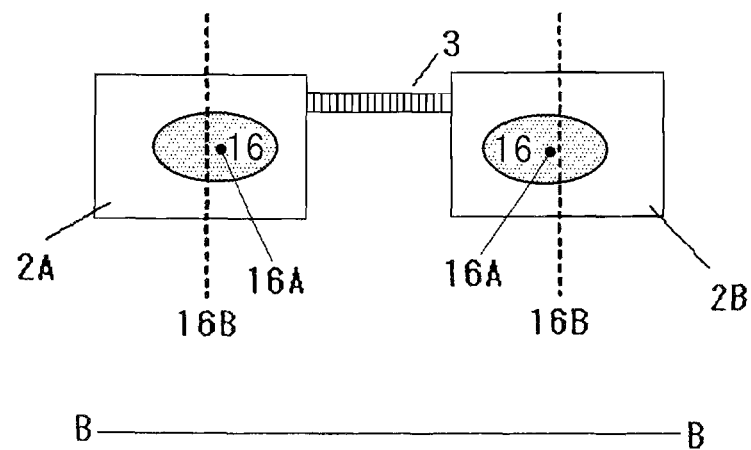
FIG. 17 is a descriptive diagram describing the arrangement of a center electrode.

Thus, as shown in FIG. 17, it is preferable that center point 16A of center electrode 16 be arranged inside center line 16B of each of liquid crystal shutters 2A and 2B in the left and right direction (B-B direction) of liquid crystal shutter eyeglass 1. In other words, it is preferable that center point 16A of center electrode 16 of each of liquid crystal shutters 2A and 2B lie between center line 16B of one of the liquid crystal shutters and the other liquid crystal shutter.

When liquid crystal shutter eyeglass 1 is structured as described above, driving section 51 can apply a voltage to separate electrodes and thereby change the state between the light transmitting state and the light shading state of a driving region corresponding to the segmented electrode, whereas controlling section 52 can select a separate electrode to which driving section 51 applies a voltage and thereby adjust at least one of the size and position of the driving region.

According to this embodiment, liquid crystal shutter 2 has a pair of transparent substrates 11A and 11B, electrodes 12A and 12B respectively formed on transparent substrates 11A and 11B, liquid crystal layer 13 injected between electrodes 12A and 12B, and a pair of polarizing layers 5A and 5B that sandwich transparent substrates 11A and 11B. At least one of electrodes 12A and 12B is a segmented electrode divided into a plurality of separate electrodes. Driving section 51 applies a voltage to the separate electrodes so as to change the state of the driving region. Controlling section 52 selects separate electrodes to which the driving section applies a voltage and thereby adjusts at least one of the size and position of the driving region.

Since liquid crystal shutter 2 has both polarizing layers 5A and 5B, the angles of polarizing planes of polarizing layers 5A and 5B can be always kept at predetermined angles. Thus, since liquid crystal shutter 2 can adequately cause the light to be transmitted therethrough and to be shaded, more excellent images can be provided to the viewer.

In addition, display light emitted from the field sequential display can be non-polarized light. Thus, even if a display device that outputs non-polarized light is used as a field sequential display, a polarizing filter does not need to be provided on the field sequential display. As a result, if the field sequential display simultaneously function as an ordinary display that displays ordinal images that do not need to be displayed on the time division basis, the ordinary images can be prevented from becoming dark.

Figure 18:
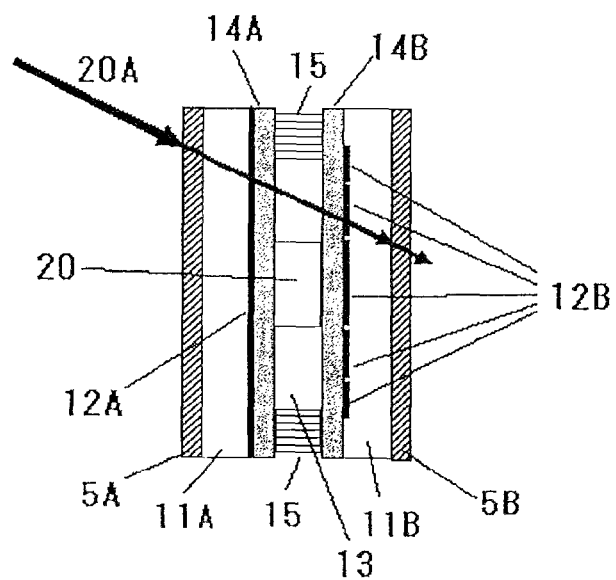
FIG. 18 is a sectional view showing another example of the liquid crystal shutter.

In addition, as shown in FIG. 18, ambient light 20A that has passed through other than driving region 20 passes through polarizing layers 5A and 5B. At this point, since ambient light 20A is attenuated by polarizing layers 5A and 5B, ambient light 20A that enters the eyes of the viewer becomes dark. Thus, the pupils of the eyes of the viewer dilate. As a result, the viewer can be caused to sense brightly display images emitted from the field sequential display and thereby more excellent images can be provided.

In addition, according to this embodiment, a segmented electrode has as separate electrodes center electrode 16 and outer peripheral electrodes 17A and 17B that surround the center electrode.

In this case, the driving region can be adequately adjusted using a relatively small number of separate electrodes.

Moreover, according to this embodiment, center electrode 16 is formed in an elliptic shape whose longer axis direction is parallel to the left and right direction of liquid crystal shutter eyeglass 1 or center electrode 16 is formed in a rectangular shape whose longitudinal direction is parallel to the left and right direction of liquid crystal shutter eyeglass 1.

In this case, since a driving region that widens in the left and right direction in which the line of sight of the viewer tends to move, rather than the up and down direction, even if the line of sight of the viewer varies, display light that is emitted from the field sequential display and that enters the eyes of the viewer can be adequately caused to be transmitted and to be shaded.

In addition, according to this embodiment, it is preferable that center point 16A of center electrode 16 of each of liquid crystal shutters 2A and 2B lie between center line 16B of one of the liquid crystal shutters and the other liquid crystal shutter.

In this case, since the center of the driving region can be placed between the forward direction of the face to which the line of sight of the viewer tends to orient and the center direction of the face, display light that is emitted from the field sequential display and that enters the eyes of the viewer can be adequately caused to transmitted and to be shaded.

Next, a third embodiment will be described. In this embodiment, another example of electrodes 12A and 12B will be described.

Figure 19:
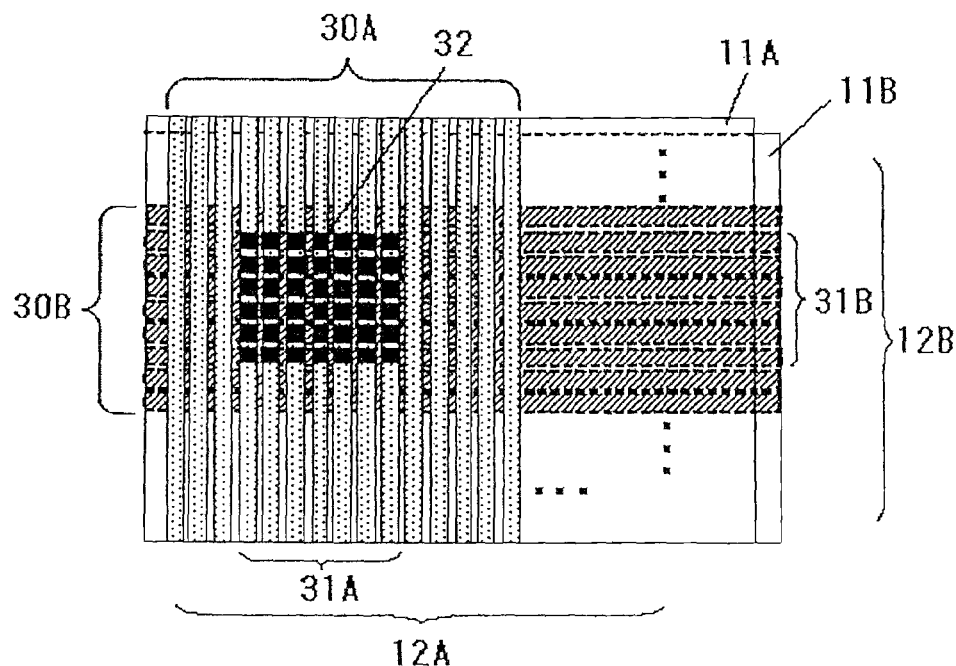
FIG. 19 is a schematic diagram showing another example of the segmented electrode.

FIG. 19 is a plan view showing another example of electrodes 12A and 12B.

In FIG. 19, both electrodes 12A and 12B are segmented electrodes. Electrode 12A has as separate electrodes a plurality of line electrodes 30A, whereas electrode 12B has as separate electrodes a plurality of line electrodes 30B. The line electrodes are rectangular electrodes.

Line electrodes 30A are arranged in one direction and line electrodes 30B are arranged in another direction. Line electrodes 30A are respectively intersected with line electrodes 30B. Thus, electrodes 12A and 12B compose matrix-shaped electrode pairs. According to this embodiment, line electrodes 30A are respectively orthogonal to line electrodes 30B.

Controlling section 52 selects line electrodes 31A and 31B to which driving section 51 applies a voltage from line electrodes 30A and 30B. Driving section 51 applies a voltage to line electrodes 31A and 31B that controlling section 52 has selected.

In this example, driving section 51 applies a voltage to line electrodes 31A and 31B such that the potential between line electrodes 31A and 31B is a threshold or greater at which liquid crystal molecules in liquid crystal layer 13 vary, and the potential between each of line electrodes 31A and 31B and each of line electrodes 30A or 30B to which no voltage is applied becomes the threshold or lower than the threshold.

Thus, the region sandwiched by line electrodes 31A and 31B becomes driving region 32. Thus, when controlling section 52 selects line electrodes 30A and 30B to which a voltage is applied, at least one of the size and position of driving region 32 can be adjusted.

Figure 20:
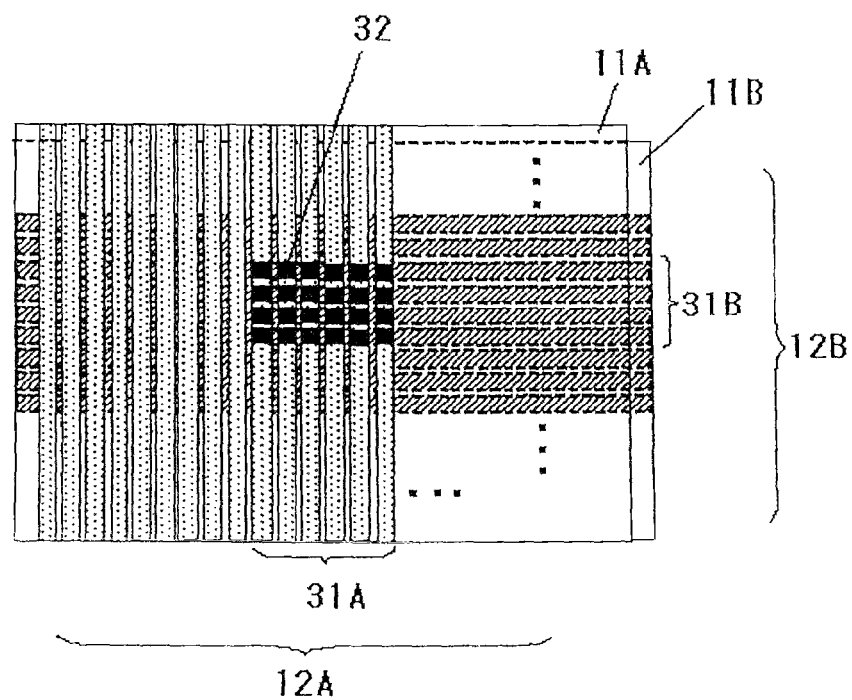
FIG. 20 is a schematic diagram showing another example of the segmented electrode.

For example, as shown in FIG. 20, if line electrode 31A to which a voltage is applied moves to the left, driving region 32 also moves to the right; if the number of line electrodes 31A and 31B decreases, driving region 32 becomes small.

Figure 21:
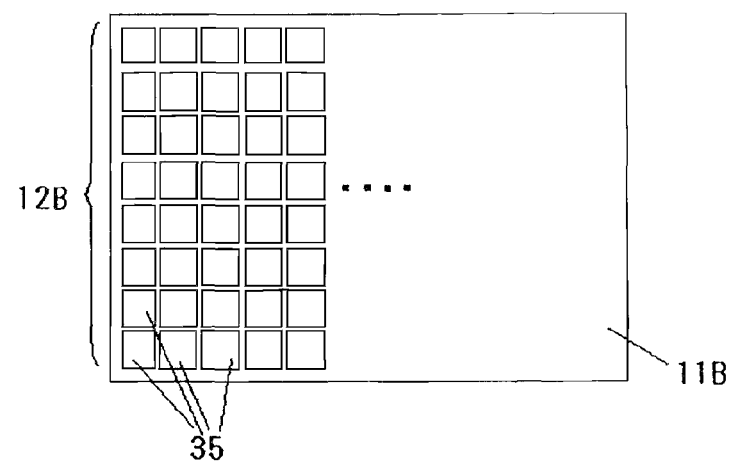
FIG. 21 is a schematic diagram showing another example of the segmented electrode.

Alternatively, at least one of electrodes 12A and 12B may be divided in a lattice shape. FIG. 21 is a plan view showing electrode 12B divided in a lattice shape. In FIG. 21, separate electrodes 35 of electrode 12B are arranged in a lattice shape.

According to this embodiment, electrode 12A has a plurality of line electrodes 31A, whereas electrode 12B has a plurality of line electrodes 31B. In addition, line electrodes 31A are respectively intersected with line electrodes 31B. Alternatively, at least one of electrodes 12A and 12B may be divided in a lattice shape.

In this case, the driving region can be precisely adjusted.

Next, a fourth embodiment will be described. In this embodiment, the structure of liquid crystal shutter eyeglass 1 will be described in more detail.

Figure 22:
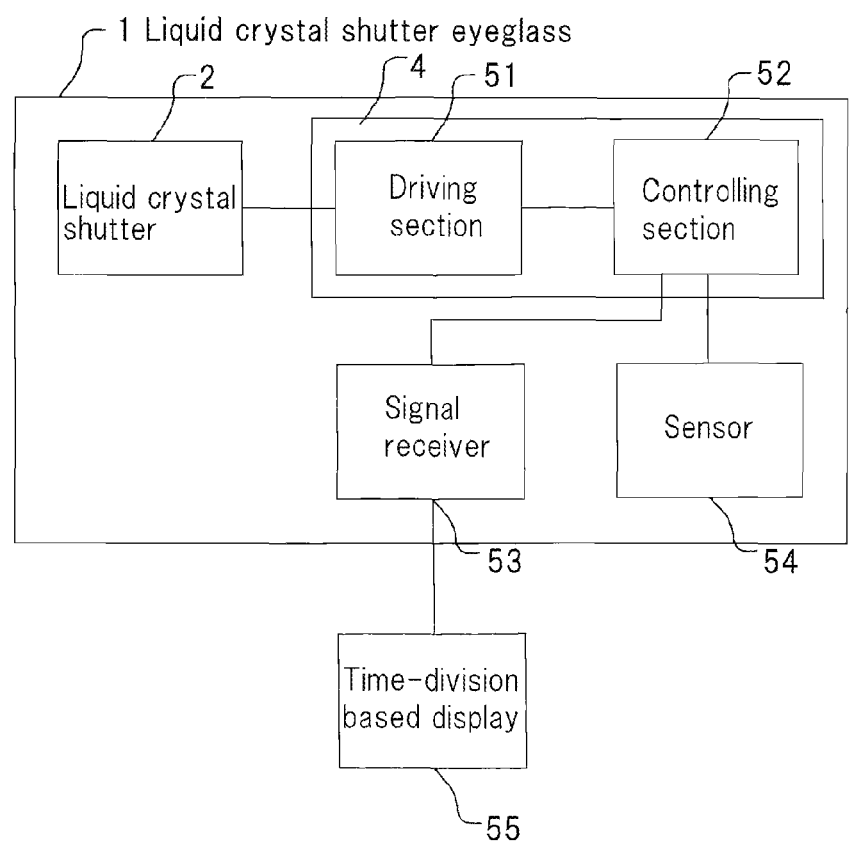
FIG. 22 is a block diagram showing another example of the liquid crystal shutter eyeglass.

FIG. 22 is a block diagram showing the structure of liquid crystal shutter eyeglass 1 according to this embodiment. In FIG. 22, liquid crystal shutter eyeglass 1 has liquid crystal shutter 2, controlling device 4 that includes driving section 51 and controlling section 52, signal receiver 53, and sensor 54.

Signal receiver 53 receives a synchronization signal from field sequential display 55. The synchronization signal represents timing at which a change in the state of liquid crystal shutter 2 occurs between the light transmitting state and the light shading state. Communication between signal receiver 53 and field sequential display 55 includes for example infrared wireless communication and Bluetooth (registered trademark) based wireless communication.

Sensor 54 is an example of detecting means. Sensor 54 detects the line of sight of the viewer who wears the liquid crystal eyeglass.

Controlling section 52 adjusts at least one of the size and position of the driving region corresponding to the line of sight detected by sensor 54.

For example, sensor 54 detects the direction of the line of sight of the viewer. On the other hand, controlling section 52 identifies the position and size of a driving region that fits the direction of the line of sight detected by sensor 54 and selects electrodes corresponding to the driving region.

Driving section 51 applies a voltage to the electrodes, which controlling section 52 has selected, in synchronization with a timing that the synchronization signal, that signal receiver 53 has received, represents so as to change the state between the light transmitting state and the light shading state.

Figure 23:
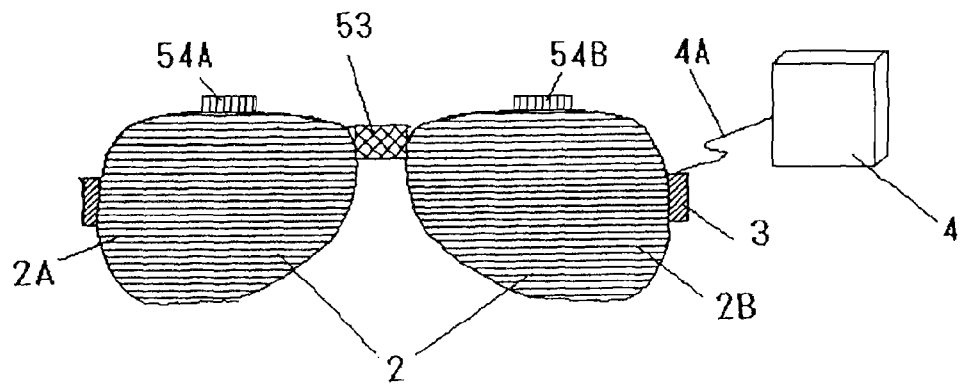
FIG. 23 is a plan view showing the appearance of the liquid crystal shutter eyeglass.

FIG. 23 is a plan view showing the appearance of liquid crystal shutter eyeglass 1 according to this embodiment. FIG. 23 shows liquid crystal shutter 2, eyeglass frame 3, controlling device 4, signal receiver 53, and sensor 54 that compose liquid crystal shutter eyeglass 1.

In FIG. 23, signal receiver 53 is provided at a bridge of eyeglass frame 3. Sensor 54 has right-eye type sensor 54A that detects the line of sight of the right eye, and left-eye type sensor 54B that detects the line of sight of the left eye. Sensors 54A and 54B are provided on a rim of eyeglass frame 3.

Alternatively, the locations of signal receiver 53 and sensor 54 are not limited to those of the example shown in FIG. 23, but may be changed.

Next, the operation of liquid crystal shutter eyeglass 1 will be described.

Figure 24:
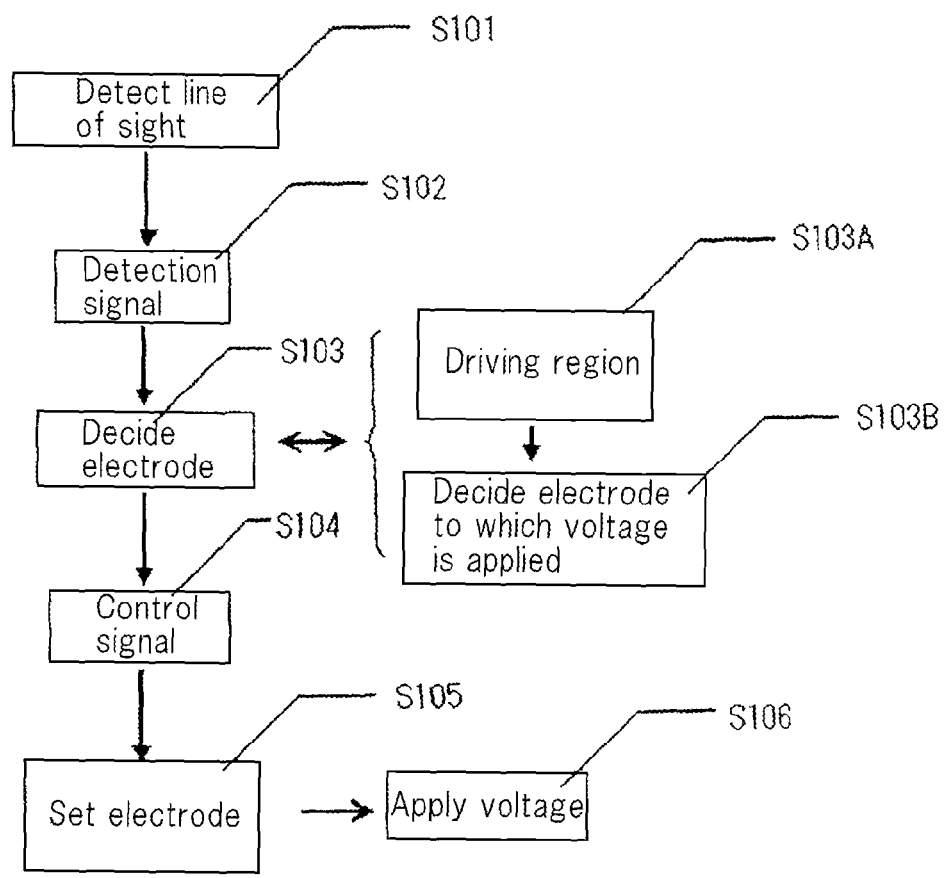
FIG. 24 is a flow chart describing an example of the operation of the liquid crystal shutter eyeglass.

FIG. 24 is a flow chart describing an example of the operation of liquid crystal shutter eyeglass 1.

First, sensor 54 detects the direction of the line of sight of the viewer (at step S101) and outputs a detection signal that represents the direction of the line of sight, which has been detected, to controlling section 52 (at step S102).

Then, when controlling section 52 accepts the detection signal, controlling section 52 decides separate electrodes to which driving section 51 applies a voltage based on the detection signal (at step S103).

Specifically, first, controlling section 52 decides a driving region based on the direction of the line of sight that the detection signal represents (at step S103A).

For example, controlling section 52 decides an elliptic region or a rectangular region shape whose center is the direction of the line of sight as a driving region. The size of the driving region may be constant or may be decided based on the direction of the line of sight.

If the size of the driving region is decided based on the direction of the line of sight, controlling section 52 decreases the driving region since the direction of the line of sight is far from the center direction of the face (liquid crystal shutter eyeglass 1). This means that the distance from the viewer to the field sequential display becomes large as the direction of the line of sight is far from the center direction of the face and thereby when the driving region is decreased in proportion to the distance, excellent images are provided to the viewer.

When controlling section 52 decides the driving region, it selects separate electrodes corresponding to the driving region as electrodes to which a voltage is applied (at step S103B).

For example, controlling section 52 pre-stores correlation information that correlates driving region and separate electrodes. Controlling section 52 decides separate electrodes corresponding to the selected driving region based on the correlation information as electrodes to which a voltage is applied.

When controlling section 52 decides separate electrodes, it outputs a control signal that represents the decided separate electrodes to driving section 51 (at step S104).

When driving section 51 accepts the control signal, driving section 51 sets the separate electrodes that the control signal represents as electrodes to which a voltage is applied (at step S105). Thereafter, when signal receiver 53 receives the synchronization signal, signal receiver 53 outputs the synchronization signal to driving section 51 through controlling section 52. When driving section 51 accepts the synchronization signal, driving section 51 applies a voltage to the separate electrodes or stops applying the voltage in synchronization with the timing that the synchronization signal represents (at step S106). Thus, a change occurs in the state of the driving region between the light transmitting state and the light shading state.

According to this embodiment, sensor 54 detects the line of sight of the viewer. Controlling section 52 adjusts at least one of the size and position of the driving region corresponding to the line of sight detected by sensor 54.

In this case, since the driving region can be automatically adjusted, the viewer's intervention can be reduced.

Next, a fifth embodiment will be described.

According to this embodiment, field sequential display 55 measures the relative positions of liquid crystal shutter eyeglass 1 and field sequential display 55. According to this embodiment, field sequential display 55 is used as an example of the display device.

Figure 25:
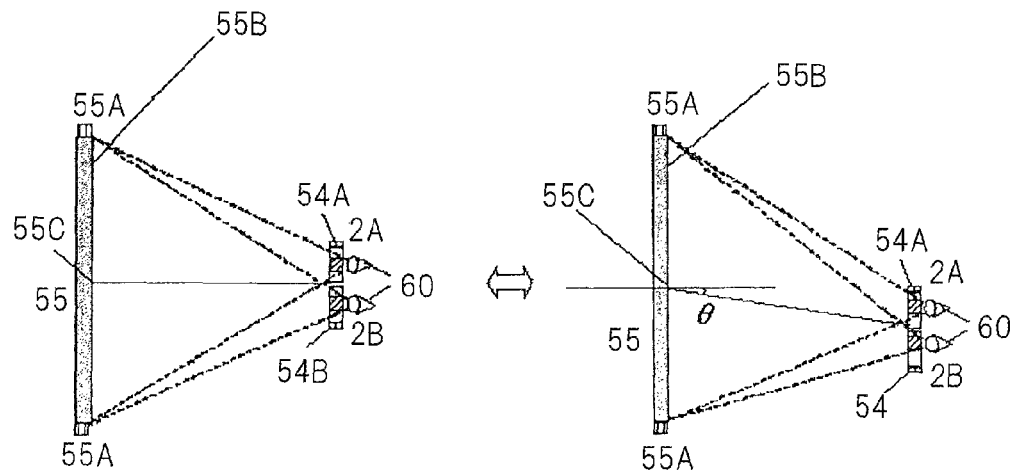
FIG. 25 is a descriptive diagram describing measurement of relative positions by a field sequential display.

FIG. 25 is a descriptive diagram describing that the relative positions are measured by field sequential display 55. FIG. 25 shows that viewer 60 who wears liquid crystal shutter eyeglass 1 is viewing field sequential display 55.

Field sequential display 55 has position sensors 55A. Position sensors 55A are provided respectively on both sides of display screen 55B of field sequential display 55 and detect the distances from the positions of position sensors 55A to liquid crystal shutter eyeglass 1. Field sequential display 55 measures the relative positions of liquid crystal shutter eyeglass 1 and field sequential display 55 based on the detected distances.

The relative positions include the distance from field sequential display 55 to liquid crystal shutter eyeglass 1. Alternatively, the relative positions may include the angle between field sequential display 55 and liquid crystal shutter eyeglass 1.

The distance from field sequential display 55 to liquid crystal shutter eyeglass 1 is specifically the distance from display screen 55B of field sequential display 55 to liquid crystal shutter eyeglass 1. On the other hand, the angle of field sequential display 55 and liquid crystal shutter eyeglass 1 is specifically the angle of a line perpendicular to display screen 55B of field sequential display 55 and a line that connects center point 55C of display screen 55B of field sequential display 55 and liquid crystal shutter eyeglass 1.

When field sequential display 55 measures the relative positions, it transmits position information that represents the measured positions to signal receiver 53 of liquid crystal shutter eyeglass 1.

Signal receiver 53 receives the position information in addition to the synchronization signal from field sequential display 55. According to this embodiment, signal receiver 53 functions as both receiving means and accepting means.

Controlling section 52 adjusts at least one of the size and position of the driving region based on the position information received by signal receiver 53 and the line of sight detected by sensor 54.

Next, the operation of liquid crystal shutter eyeglass 1 according to this embodiment will be described.

Figure 26:
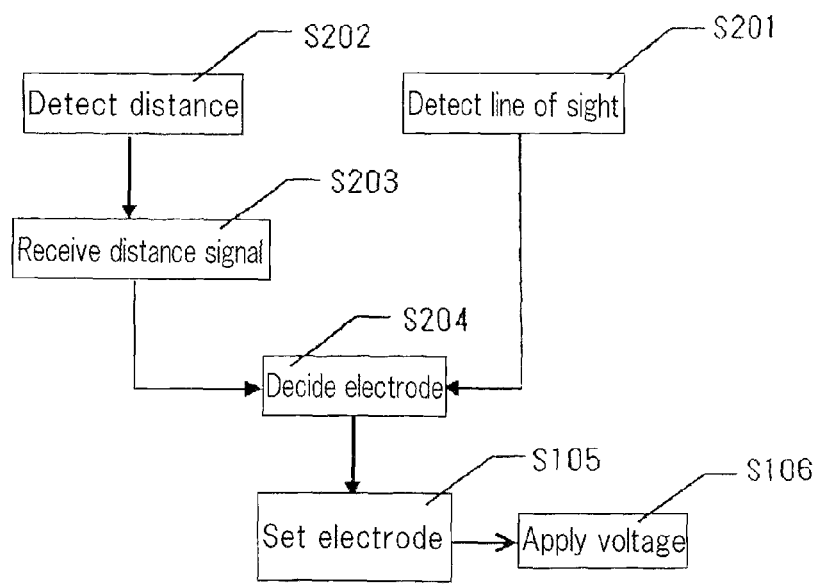
FIG. 26 is a flow chart describing an example of the operation of the liquid crystal shutter eyeglass.

FIG. 26 is a flow chart describing the operation of liquid crystal shutter eyeglass 1 according to this embodiment.

First, sensor 54 detects the direction of the line of sight and outputs a detection signal that represents the detected direction of the line of sight to controlling section 52 (at step S201).

On the other hand, field sequential display 55 measures the relative positions of field sequential display 55 and liquid crystal shutter eyeglass 1 using position sensors 55A and outputs position information that represents the relative positions (at step S202).

When signal receiver 53 receives the position information, signal receiver 53 outputs the position information to controlling section 52 (at step S203).

When controlling section 52 accepts the detection signal and the position signal, controlling section 52 decides a driving region based on the detection signal and the position information.

For example, controlling section 52 decides an elliptic region or a rectangular region whose center is the direction of the line of sight as a driving region. In addition, controlling section 52 decreases the driving region in proportion to the distance that the position information represents. This means that when the driving region is decreased in proportion of the distance from viewer 60 to field sequential display 55, excellent images can be provided to the viewer.

In addition, controlling section 52 identifies whether the viewer is present on the left or right of display screen 55B of field sequential display 55 based on the angle that the position information represents. Controlling section 52 moves the center of the driving region in the reverse direction from the side on which the viewer is present. In addition, controlling section 52 decreases the driving region in proportion to the distance that the position information represents. In this case, sensor 54 can be omitted.

When controlling section 52 decides the driving region, controlling section 52 decides separate electrodes to which a voltage is applied based on the driving region and outputs a control signal that represents the separate electrodes (at step S204). When controlling section 52 outputs the control signal, then step S105 and S106 are executed.

According to this embodiment, signal receiver 53 receives the position information that represents the relative positions of liquid crystal shutter eyeglass 1 and field sequential display 55. Controlling section 52 adjusts at least one of the size and position of the driving region based on the position information that signal receiver 53 has received.

In this case, since the driving region can be automatically adjusted, the viewer's intervention can be reduced.

Next, a sixth embodiment will be described.

According to this embodiment, liquid crystal shutter 2 is attachable to and detachable from eyeglass frame 3.

Figure 27:
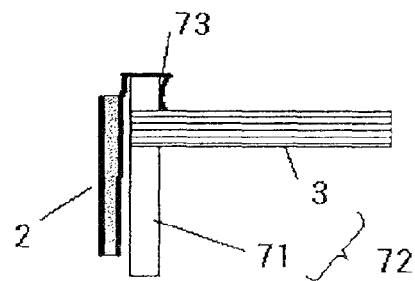
FIG. 27 is a side view showing a liquid crystal shutter eyeglass having a liquid crystal shutter that is attachable thereto and detachable therefrom.

FIG. 27 is a side view showing liquid crystal shutter 2 that is attachable to and detachable from eyeglass frame 3.

FIG. 27 shows that vision correction lens 71 is attached to a lens section of eyeglass frame 3 and that eyeglass frame 3 and vision correction lens 71 compose vision correction eyeglass 72. On the other hand, liquid crystal shutter 2 is attached in front of vision correction lens 71.

Liquid crystal shutter 2 is attached in front of vision correction lens 71 with fixture 73 that attachably and detachably fixes liquid crystal shutter 2.

According to this embodiment, since liquid crystal shutter 2 is attachable to and detachable from eyeglass frame 3, liquid crystal shutter eyeglass 1 can simultaneously function as another eyeglass, such as a vision correction eyeglass.

Now, with reference to the embodiments, the present invention has been described. However, it should be understood by those skilled in the art that the structure and details of the present invention may be changed in various manners without departing from the scope of the present invention.

The present application claims priority based on Japanese Patent Application JP 2009-146496 filed on Jun. 19, 2009, the entire contents of which are incorporated herein by reference in its entirety.

What is claimed is:

1. A liquid crystal shutter eyeglass, comprising:
   a liquid crystal shutter comprising a light transmitting and shading region in which a change can occur in the state of the liquid crystal shutter between a light transmitting state in which light is caused to be transmitted and a light shading state in which light is caused to be shaded;
   a driving section configured to change the state between said light transmitting state and said light shading state of a driving region that is at least part of said light transmitting and shading region; and
   a controlling section configured to adjust a size of said driving region;
   a receiver configured to receive a synchronization signal that represents a timing at which the state between said light transmitting state and said light shading state changes; and
   an accepting section configured to receive position information that represents relative positions of said liquid crystal shutter eyeglass and of a predetermined display device;
   wherein, said driving section is further configured to change the state between said light transmitting state and said light shading state based on the synchronization signal that said receiver has received, and
   said controlling section is further configured to decrease both a length and a width of the driving region in proportion to the distance between said liquid crystal shutter and said display device based on the position information which is received by said accepting section.

2. The liquid crystal shutter eyeglass as set forth in claim 1,
   wherein said liquid crystal shutter comprises:
   a pair of transparent substrates;

a pair of electrodes respectively formed on the transparent substrates;
a liquid crystal layer injected between said electrodes; and
a pair of polarizing layers that sandwich said transparent substrates,
wherein at least one of said pair of electrodes is a segmented electrode that is divided into a plurality of separate electrodes,
wherein said driving section is further configured to apply a voltage to said separate electrodes so as to change the state between said light transmitting state and said light shading state of said driving region, and
wherein said controlling section is further configured to select a separate electrode to which said driving section applies the voltage so as to adjust at least one of the size and the position of said driving region.

3. The liquid crystal shutter eyeglass as set forth in claim 2,
wherein said segmented electrode comprises as said separate electrodes a center electrode and an outer peripheral electrode that surrounds said center electrode.

4. The liquid crystal shutter eyeglass as set forth in claim 3,
wherein said center electrode is formed in an elliptical shape whose longer axis direction is parallel to a left and right direction of said liquid crystal shutter eyeglass.

5. The liquid crystal shutter eyeglass as set forth in claim 3,
wherein said center electrode is formed in a rectangular shape whose longitudinal direction is parallel to a left and right direction of said liquid crystal shutter eyeglass.

6. The liquid crystal shutter eyeglass as set forth in claim 3,
wherein said two liquid crystal shutters are arranged in the left and right direction of said liquid crystal shutter eyeglass, and
wherein a center point of the center electrode of each of said liquid crystal shutters lies between a center line of one of the liquid crystal shutters arranged in said left and right direction and the other liquid crystal shutter.

7. The liquid crystal shutter eyeglass as set forth in claim 3,
wherein each of the electrodes of said pair of electrodes are said segmented electrodes and each of the electrodes has as said separate electrodes a plurality of line electrodes, and
wherein the line electrodes of one of said pair of electrodes are respectively intersected with the line electrodes of the other of said electrodes.

8. The liquid crystal shutter eyeglass as set forth in claim 3,
wherein said separate electrodes are arranged in a lattice shape.

9. The liquid crystal shutter eyeglass as set forth in claim 1, further comprising:
detecting means configured to detect a line of sight of a viewer,
wherein said controlling means is further configured to adjust at least one of the size and the position of said driving region based on the line of sight detected by said detecting means.

10. The liquid crystal shutter eyeglass as set forth in claim 1, further comprising:
a detecting section configured to detect a line of sight of a viewer,
wherein
said two liquid crystal shutters are arranged in the left and right direction of said liquid crystal shutter eyeglass, each liquid crystal shutter comprising said light transmitting and shading region, and
said controlling section is further configured to decreases the driving region as the direction of the line of sight is moved away from the center direction of said liquid crystal shutter eyeglass based on the position information, which is received by said accepting section, and based on the line of sight which is detected by said detecting section.

* * * * *